Sept. 13, 1966         C. H. STEIN ET AL         3,271,862
                      SCRIBING INSTRUMENTS
Original Filed April 20, 1961                4 Sheets-Sheet 1

INVENTOR
CHARLES H. STEIN
WILLIAM KRAUSE
BY *Milford A. Juten*
ATTORNEY

Sept. 13, 1966  C. H. STEIN ET AL  3,271,862
SCRIBING INSTRUMENTS
Original Filed April 20, 1961  4 Sheets-Sheet 2

INVENTORS
CHARLES H. STEIN
& WILLIAM KRAUSE
BY Milford A. Juden
ATTORNEY

Sept. 13, 1966 C. H. STEIN ET AL 3,271,862
SCRIBING INSTRUMENTS
Original Filed April 20, 1961
4 Sheets-Sheet 3

INVENTORS
CHARLES H. STEIN
& WILLIAM KRAUSE
BY
ATTORNEY

Sept. 13, 1966 C. H. STEIN ET AL 3,271,862
SCRIBING INSTRUMENTS
Original Filed April 20, 1961 4 Sheets-Sheet 4
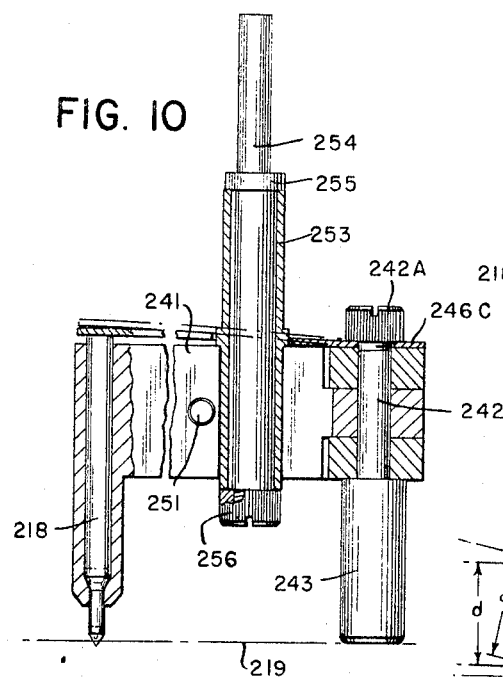
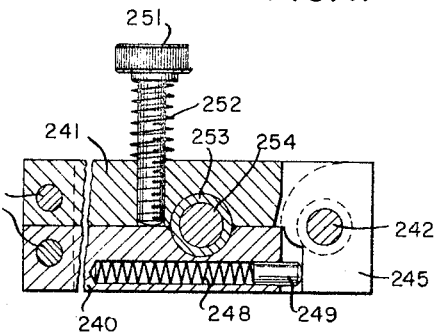
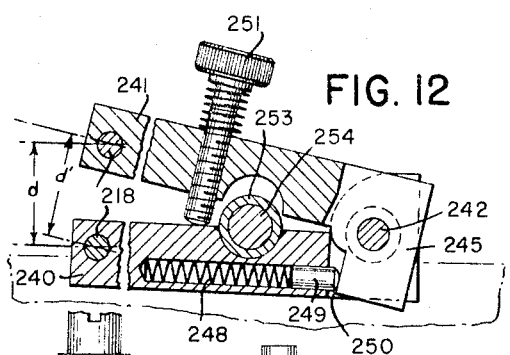
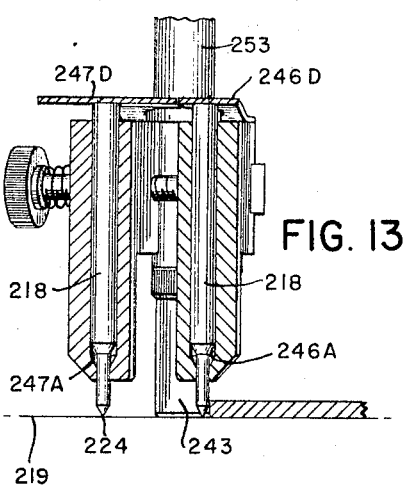
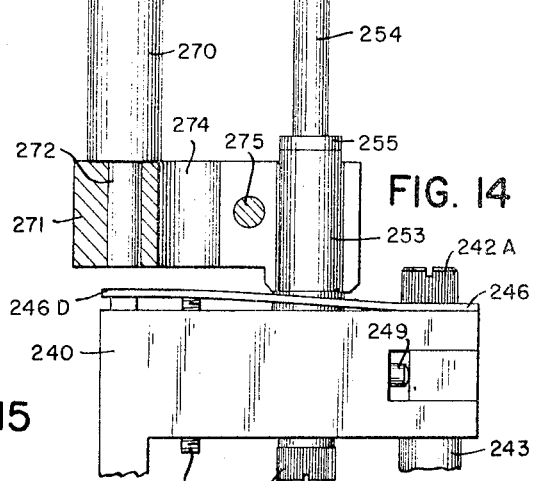
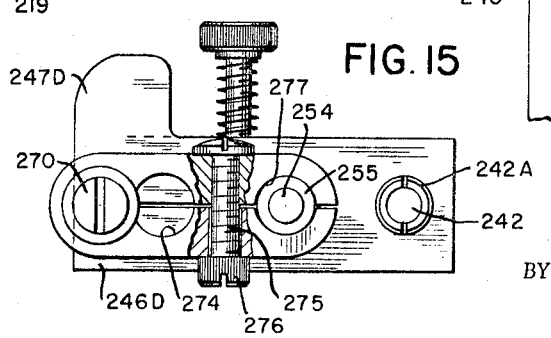
INVENTORS
CHARLES H. STEIN
& WILLIAM KRAUSE
BY Milford A. Juten
ATTORNEY United States Patent Office 3,271,862
Patented Sept. 13, 1966

3,271,862
SCRIBING INSTRUMENTS
Charles H. Stein, Westwood, and William Krause, Secaucus, N.J., assignors to Keuffel & Esser Company, Hoboken, N.J., a corporation of New Jersey
Original application Apr. 20, 1961, Ser. No. 104,482. Divided and this application Mar. 1, 1965, Ser. No. 443,743
9 Claims. (Cl. 33—18)

The present application is a division of copending prior application Serial No. 104,482, filed April 20, 1961, now Patent 3,197,871, issued August 3, 1965, which is a continuation-in-part of our application Serial No. 817,852, filed June 3, 1959, now abandoned, the priority of both of these applications being claimed for the present application.

The present invention relates to instruments for making master templates for cartography circuit cards and the like where accurate duplications are essential for accurate registry in maps and to obtain constant electrical characteristics in duplicate circuti cards including constant resistance of conductors and constant capacitance between adjacent conductors in each completed circuit card.

Heretofore scribing and cutting instruments of many different designs which usually had a single scribing or cutting edge have been used but the lines and cuts have been coarse and irregular and the edges of the outlined areas have not been parallel and even with a photographic reduction step in the process the reproductions particularly in circuit cards have had objectionable variations in the sizes of the conductors with resulting inaccuracies in the circuits. Also, the previous method of production of a circuit card master with the heretofore known instruments involved many delays.

An object of the present invention is to provide means and method to obtain accurate reproductions in cartography and in circuit cards with a minimum of variation and a minimum of skilled personnel.

Another object is to provide scribing and cutting instruments which trace the pattern for circuit cards.

A further object is to provide pattern tracing instruments which can be used to accurately follow straight, concave and convex edge guides.

Another object is to provide instruments for obtaining scribing and/or cutting of two lines in one operation.

Another object is to provide methods of producing accurate masters for graphic arts.

A further object is to provide a method of making a finished circuit card involving a master pattern or template from which the circuit card is duplicated.

Other and further objects will be apparent as the description proceeds and upon reference to the accompanying drawings, wherein.

Figure 4:
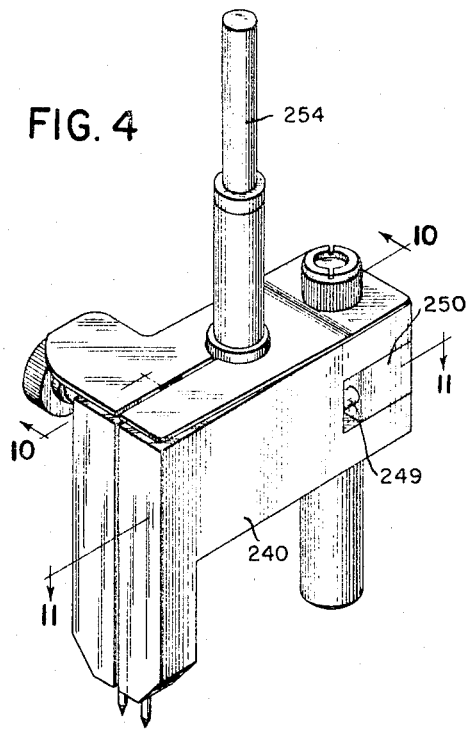
FIGURE 4 is a perspective of a scribing device including two L-shaped bodies hingedly connected together by corresponding legs so the other legs remain parallel providing for mounting in either a lead holder or in a drop center compass for making parallel lines following a guiding edge or making arcuate lines respectively and providing for accurate connection of straight and arcuate lines.

FIGURE 10 is a vertical section taken substantially on broken plane 10—10 of FIGURE 4 showing the hingedly mounted L-shaped body and the scribing point therein and showing the tubular support shank for the main L-shaped body with the shouldered shaft rotatable therein providing for mounting of the scribing device on a lead holder in fixed relation on the tubular supporting shank and in rotatable relation on the rotatable shouldered shaft.

FIGURE 11 is a horizontal section taken substantially on broken plane 11—11 of FIGURE 4 showing the hinge connection by a pivot pin of the first legs of the two L-shaped bodies to maintain the other legs in parallel relation and showing the spring pressed plunger for biasing the bodies together toward their abutting position shown and showing the thumb screw for separating the other legs of the bodies carrying the scribing elements to provide for different distances between the scribed lines.

FIGURE 12 is a section similar to FIGURE 11 showing the scribing points in spaced relation an intermediate distance for scribing more widely spaced lines.

FIGURE 13 is a vertical section through the axes of the scribing elements looking toward the pivot pin and stud extension showing the guiding action of a guiding edge on the scribing point on the main L-shaped body and the guiding action on the stud extension.

FIGURE 14 is a fragmentary elevation with parts in section and parts omitted showing the scribing device of FIGURE 4 mounted in fixed relation on the adapter for mounting on a drop center compass and showing the means to vary the bias of the leaf spring portions to obtain equal scribing action on the scribing points of the scribing elements.

FIGURE 15 is a plan view of the adapter and the scribing screw for connecting the adapter to the tubular shank fixed to the main L-shaped body of the scribing device.

Figure 16:
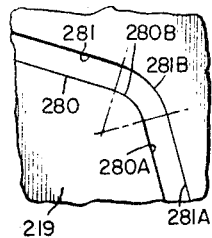

FIGURE 16 is a fragment of a scribe or peel coated material showing two pairs of straight parallel lines drawn by the scribing device shown in FIGURE 4 and also showing connecting arcs drawn between such pairs of straight parallel lines by the same scribing device mounted in a drop center compass.

Figure 1:
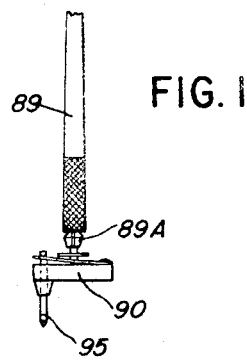
FIGURE 1 is a side elevation of a device for scribing parallel lines and mounted in the jaws of a clutch pencil type holder shown fragmentarliy.
Figure 2:
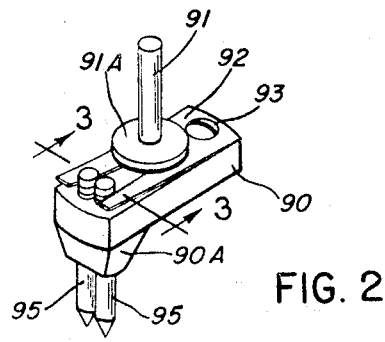
FIGURE 2 is an enlarged isometric view of the parallel line scribing device of FIGURE 1 showing the spring by which uniform pressure is obtained on the scribing points and showing the flange for limiting the insertion of the supporting stem in a clutch type pencil holder.
Figure 3:
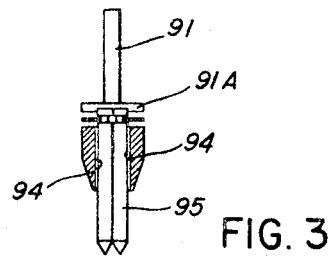
FIGURE 3 is a transverse section taken substantially on line 3—3 of FIGURE 2 showing the close positioning of the scribing points.

Referring more particularly to FIGURES 1–3, inclusive, a scriber particularly useful in scribing parallel lines in a scribe coating on a dimensionally stabilized polyethylene terephthalate film is shown applied to a conventional pencil or pen type holder 89 having clutch jaws 89A. The scribing tool comprises a body 90 preferably formed of metal or the like having an upwardly extending shank 91 fixed thereto, said shank carrying flange 91A, the shank 91 being adapted for reception in the lead gripping jaws 89A of the holder, the flange 91A limiting the insertion thereof. A leaf spring 92 is secured to one end of the body 90 by a screw 93 threaded into the body 90, the spring 92 having tine leaves projecting from the other end thereof. Scribing point receiving bores 94 extend through the other end of the body 90 and through a downwardly extending enlargement 90A, the scribing points 95 and the bores 94 being cylindrical in section. The lower or scribing ends of the scribing points 95 are conically pointed to the desired sharpness to obtain the proper width of line, the upper end of each scribing point 95 being provided with a transverse chord groove 95A which receives the inner edges of the associated tine of the leaf spring. The resilient pressure on scribing points 95 is obtained by the selection of spring 92 and such spring permits one point 95 to be moved upwardly so that in the event that the holder 89 and the scribing points are not held exactly perpendicular to the work, both points will scribe uniform lines. The spacing of flange 91A from body 90 provides clearance for the spring permitting the free movement of the tines without binding.

Upon reference to FIGURES 4–16 inclusive a modified form of scribing device comprises a first or main L-shaped body 240 hingedly connected to a second L-shaped body 241 by means of a pivot pin 242 having an integral guiding stud 243 projecting axially therefrom and such pin 242 passes through bottom and top knuckles 243, 244 of the L-shaped body 240 and through a knuckle 245 in the second L-shaped body 241. The hinge connection is such that the other legs 246 and 247 of the bodies remain in parallel relation during all hinging movements. The bodies are urged together by the action of compression spring 248 received in a longitudinal bore in the first leg of the first L-shaped body 240 urges a cylindrical stud 249 slidably mounted in the same bore against an abutment surface 250 on the single knckle 245 of the other body 241. The bodies are separated by the action of a thumb screw 251 threaded into the first leg of the second L-shaped body 241 and engaging the adjacent surface of the first L-shaped body 240, a locking spring 252 surrounding the thumb screw 251 and engaging the head thereof and the L-shaped body 241 to maintain any desired adjustment. The vertical or other legs 246 and 247 are provided with scribing element receiving bases 246A, 247A respectively which have the lower portion of reduced diameter and such bores snugly and slidably receive scribing elements 218 previously described. The scribing elements 218 are urged to projected position by a leaf spring having an apertured mounting portion 246C secured by pivot pin 242 and a nut 242A in operative position, the leaf spring having projecting portions 246D and 247D which engage the upper ends of scribing elements 218 urging the scribing points 224 thereof into operative relation to a surface 219 to be scribed. It will be noted that the inner surfaces of L-shaped bodies 240 and 241 are provided with semi-cylindrical recesses receiving a shouldered tubular mounting shank 253 secured by welding, soldering or the like in the semi-circular recess of body 246. Within the shouldered tubular mounting shank 253 is a shouldered shaft 254 with its shoulder 255 engaging the upper end of the shouldered tubular mounting shank 253 the lower threaded end receiving a nut 256 secured thereto and abutting the bottom shoulder of the shaft 254 permitting rotative movement of shaft 254 within the shouldered tubular mounting shank 253.

Figure 5:
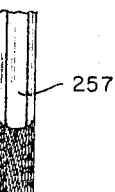
FIGURE 5 shows the scribing device mounted for pivotal movement with respect to the supporting lead holder.
Figure 6:
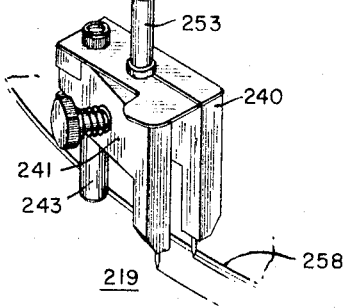
FIGURE 6 illustrates the mounting of the scribing device of FIGURE 4 in fixed relation to the supporting lead holder.

The scribing instrument may be secured to a lead holder 257 of conventional design which may clamp the reduced upper shank portion of the rotative shaft 254 as shown in FIGURE 5 permitting relative rotation of the scribing device with respect to the lead holder. The lead holder 257 may be clamped on the tubular shank 253 to maintain a fixed relation of the scribing device with respect to the lead holder 257 serving as the handle. The swivel mounting is particularly useful in cooperation with a curved guiding edge such as that shown at 258 in FIGURE 26. The stationary mounting is particularly useful with a straight guiding edge 259 as shown in FIGURE 6.

To assure proper reaction and force on the scribing elements in the bodies the biases of leaf spring portions 246D, 247D are controlled by adjusting screws 246E and 247E provided on the L-shaped bodies 246, 247 respectively to engage the leaf spring portions 246D and 247D respectively in a manner similar to that described with respect to FIGURES 1 to 4 of Patent 3,197,871, the adjustment being accomplished by a screw slot or an Allen head socket in the lower ends of the screws.

Figure 7:
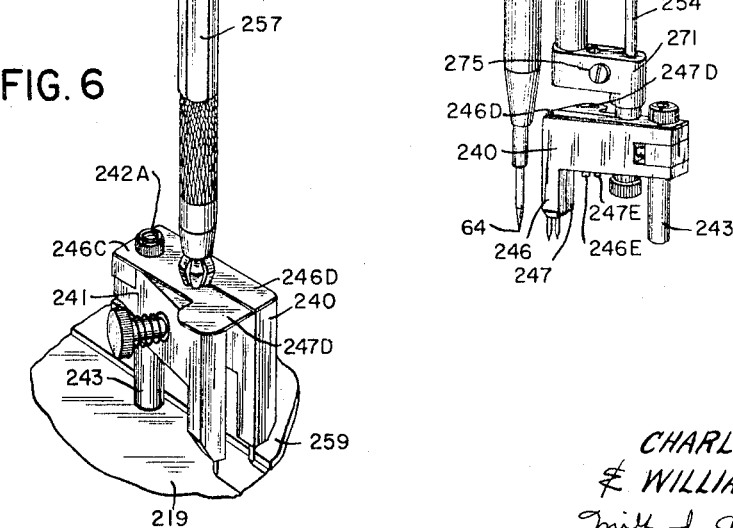
FIGURE 7 shows the scribing device of FIGURE 4 mounted by means of an adapter on the single arm of a conventional drop center compass so that arcuate lines may be scribed.

The modification of the invention shown in FIGS. 4–15 is also adaptable for mounting in a drop center compass such as that shown in FIG. 7 which includes a drop center shaft 63 having a collar 66 adjustably mounted thereon, the drop center shaft 63 and point 64 being raised for lowered by the knob 65 and is substantially the same type drop center compass shown in FIG. 5 of Patent 3,197,871.

Figure 9:
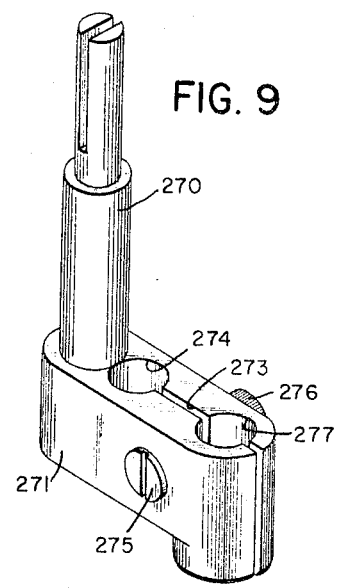
FIGURE 9 is a perspective of the adapter for mounting the scribing device of FIGURE 4 in a drop center compass.
Figure 8:
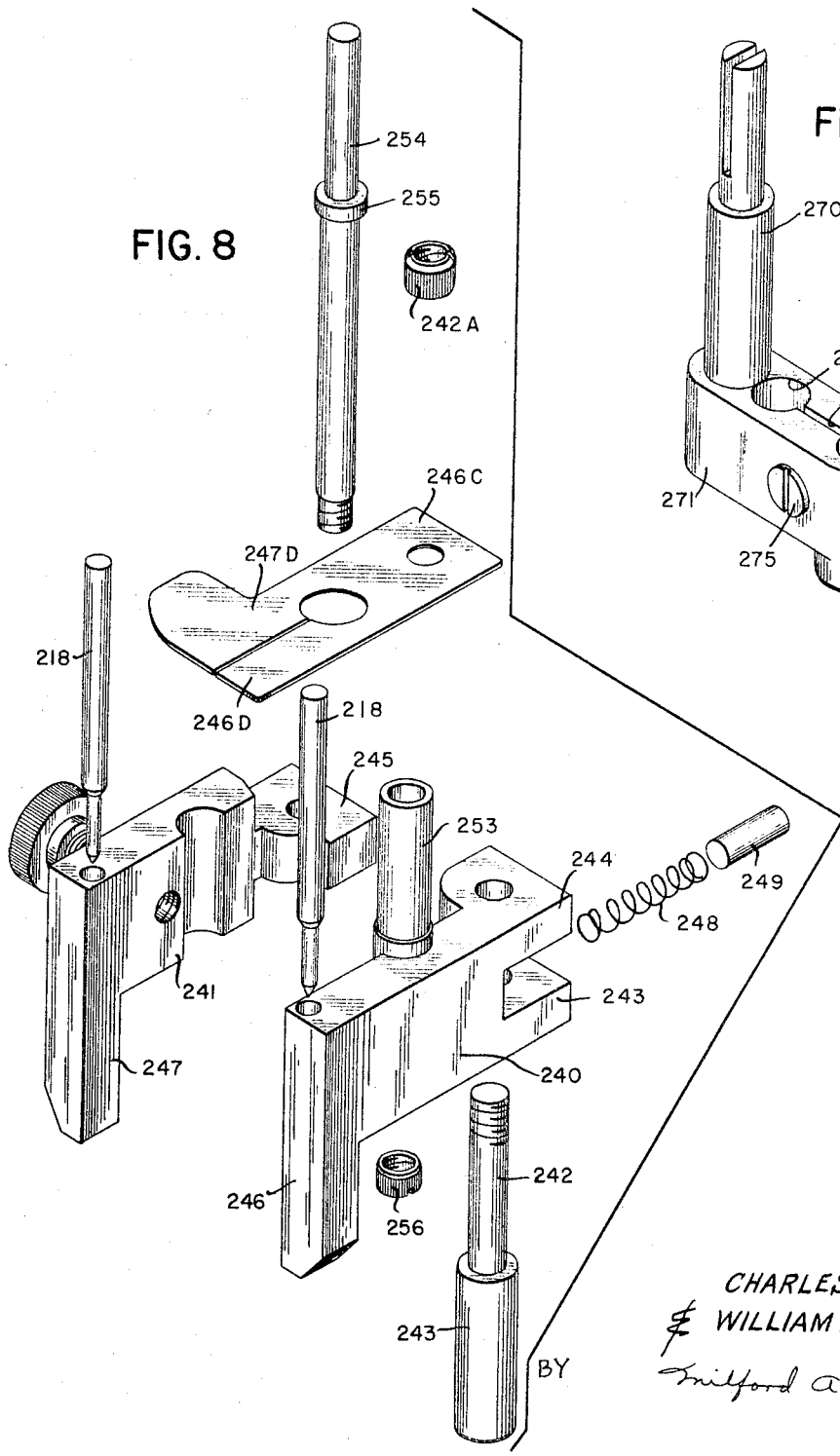
FIGURE 8 is an exploded perspective of the scribing device of FIGURE 4.

An adapter shown in FIG. 9 includes a split shank 270 which is received in the clamp 83 of the drop center compass which is controlled by screw 87 and at the lower end of the split shank 270 a member 271 is provided with a reduced bore which receives a reduced end 272 of the shank 270 and is fixed thereto by soldering or the like. The body 270 is provided with a slit 273 extending from an enlarged bore 274 adjacent the end connected to the split shank 270 to the other end of the body and a machine screw 275 is threaded into a screw threaded bore in one section and the two sections formed by the slit 273 and passing freely through an aligned bore in the other section. The section are drawn together by rotation of the nut 276 on screw 275 engaging the adjacent section. The end of the body 271 opposite the mounting shank 270 is provided with bore 277 of a size to snugly grip the tubular shank 253 of the first L-shaped scribe body 240 whereby the scribing device shown in FIGS. 4–15 can be mounted to simultaneously scribe two arcs such as the arcs shown in FIG. 16. It will be noted that the mounting shank 270 is spaced from the axis of the split bore 276 the same distance as the spacing between the axis of mounting shank 254 and the scribing pin 218 on the L-shaped body 240 and it will be apparent that the portions of the scribing elements 218 supported on the L-shaped bodies 240 and 241 can be arranged in a radial direction from the center 64 to make two arcs tangent with parallel lines 280, 281, 280A, 281A simultaneously on a scribe coated material 219 shown in FIG. 16.

It will thus be seen that the scribing device shown in FIGS. 4–15 inclusive may be used to draw parallel lines of straight or irregular curves by mounting in a lead holder as shown in FIGS. 5 and 6 or the same device may be mounted in a drop center compass by the adapter 270, 271 to simultaneously draw two parallel lines although the adjustment may have to be varied in the spacing between the scribing points 218 of the scribing device for drawing arcuate lines after having drawn straight lines, this adjustment being simply accomplished by the adjusting screw 251 with a minimum time and effort.

It will be apparent that various changes may be made within the spirit and scope of the invention within the valid interpretation of the claims.

What is claimed is:

1. A scribing device for simultaneously making two lines in substantially parallel relation comprising a first L-shaped body, a second L-shaped body hingedly connected to said first L-shaped body adjacent the free end of corresponding legs by a pivot stud parallel to the planes of the L-shaped bodies whereby the other legs remain parallel and are movable toward and away from one another, a tubular support shank fixedly mounted on said first L-shaped body for support of the instrument from a lead holder or clamp, a shouldered shaft rotatably mounted in said tubular support shank providing for pivotal support of said scribing instrument on a lead holder or clamp secured to said shouldered shaft, means to secure said shaft against axial displacement in said tubular support shank while permitting rotative movement therein, resilient means normally urging the other legs of said L-shaped body together, means to positively and adjustably separate said other legs of said L-shaped bodies, said other legs of said L-shaped bodies being provided with scribing element receiving bores therein open at both ends with said bores being of restricted size at the free extremity of said second legs whereby a shouldered scribing element will be retained in said bores while permitting longitudinal movement thereof, a leaf spring mounted on said first body and having leaf spring elements overlying said bores and engageable with said scribing elements urging said scribing elements outwardly towards said reduced ends of said bores, a guide stud portion integral with said pivot stud projecting in the direction of said other legs whereby the scribing element in said one L-shaped body and said guide stud portion may engage a guide edge for accurately guiding said instrument in a predetermined path, said separating means providing for changing the angular relation between said L-shaped bodies and thereby changing the spacing between the scribing elements and the bores scribed thereby so that parallel lines may be simultaneously scribed in one operation.

2. The invention according to claim 1 in which an adapter having a bore of a size to receive said tubular support shank engages said tubular support shank and a shoulder thereon, said adapter including an upwardly extending split shank for mounting in the clamp of a compass whereby said scribing device may be mounted in a compass and provide for scribing arcuate lines, said adapter providing for alignment of the scribe needles with the center of the compass to assure accurate tangents to pairs of intersecting parallel lines providing for arcuate connecting lines.

3. A scribing device comprising a shaft, a body extending transversely from said shaft, leaf spring means mounted on said body and extending transversely of said shaft, said leaf spring means having spaced spring portions at one end on one side of said shaft, said leaf spring means being mounted on said body and reacting on the other side of said shaft on said body, a pair of scriber cutters generally parallel to said shaft and slidably mounted in said body and projecting from the body, said leaf spring portions normally urging said scriber cutters in said projected direction, means to retain the scriber cutters on said body and limiting the projection thereof whereby substantially constant pressure will be applied to the scriber cutters.

4. A scribing device comprising a pair of bodies, a scribing element slidably mounted in a portion of each body in generally parallel relation to the scribing element mounted on the other body, means to mount one body on the other body for movement of its scribing element toward and away from the scribing element of the other body, means to retain each scribing element on its body, yieldable means reacting between said bodies and said scribing elements urging said scribing elements to projected scribing position, a guide stud positioned in spaced relation to and extending in the same general direction as said scribing elements and mounted on one of said bodies, the free ends of said guide stud and said scribing elements being out of alignment to simultaneously contact a surface to scribe two parallel lines, a supporting member mounted on one of said bodies intermediate the guide stud and the scribing elements and extending away from the scribing and guiding ends of said elements and stud, means to maintain said bodies in adjusted relation whereby one of said scribing elements and said stud will provide guiding points for contacting a guiding edge to properly and continuously position the scribing device in accurate relation with respect to a guide edge whereby accurate parallel line guiding of the scribing elements is obtained.

5. The invention according to claim 3 in which means are provided to adjust the pressure of the leaf spring portions.

6. The invention according to claim 4 in which the yieldable means include leaf spring portions and the means to mount one body on the other is a hinge structure.

7. The invention according to claim 4 in which the yieldable means includes leaf spring portions with means to adjust the force of the leaf spring portions.

8. A scribing device comprising a pair of bodies, a scribing element slidably mounted in a portion of each body in generally parallel relation to the scribing element mounted on the other body, means to mount one body on the other body for movement of its scribing element toward and away from the scribing element of the other body, means to retain each scriber element on its body, leaf spring means having spaced spring portions reacting between said bodies and said scribing elements urging said scribing elements to projected scribing positions, a supporting shaft mounted on one of said bodies intermediate the ends of said leaf spring means and extending away from the scribing elements, means to maintain said bodies in adjusted relation whereby said scribing elements are maintained in accurate spaced relation and accurate parallel lines will be drawn.

9. The invention according to claim 4 in which the supporting member includes a tubular support shank fixedly mounted on said one of said bodies for support of the device from a lead holder or clamp and a shouldered shaft rotatably mounted in said tubular support shank providing for pivotal support of said scribing device on a lead holder or clamp.

References Cited by the Examiner

UNITED STATES PATENTS

| | | | |
|---|---|---|---|
| 725,859 | 4/1903 | Moller | 33—41 |
| 1,191,725 | 7/1916 | Paulsen | 33—41 |
| 1,970,476 | 8/1934 | Schutze | 33—41 |
| 2,782,501 | 2/1957 | Adams | 33—41 X |
| 2,902,761 | 9/1959 | Koenig | 33—18 X |
| 3,067,517 | 12/1962 | Matson | 33—26 |

LEONARD FORMAN, *Primary Examiner.*

ISAAC LISANN, *Examiner.*

H. N. HAROIAN, *Assistant Examiner.*